Nov. 26, 1968   H. H. WIEDER ETAL   3,413,455
ANALOG SQUARE ROOT COMPUTER USING HALL GENERATOR
Filed Aug. 27, 1963   2 Sheets-Sheet 1

HARRY H. WIEDER
DAVID A. COLLINS
INVENTORS

BY *J. M. St. Amand*
ATTORNEY

Nov. 26, 1968  H. H. WIEDER ET AL  3,413,455
ANALOG SQUARE ROOT COMPUTER USING HALL GENERATOR
Filed Aug. 27, 1963  2 Sheets-Sheet 2

HARRY H. WIEDER
DAVID A. COLLINS
INVENTORS

BY *J. M. St. Amand*

ATTORNEY

United States Patent Office 3,413,455
Patented Nov. 26, 1968

3,413,455
ANALOG SQUARE ROOT COMPUTER USING HALL GENERATOR
Harry H. Wieder, Riverside, and David A. Collins, Ontario, Calif., assignors to the United States of America as represented by the Secretary of the Navy
Filed Aug. 27, 1963, Ser. No. 305,018
6 Claims. (Cl. 235—193.5)

ABSTRACT OF THE DISCLOSURE

A semiconductor Hall generator is used in conjunction with additional devices and circuitry to obtain an electrical output signal proportional to the square root of an applied input potential. The circuit is of importance for analog computers which may be the sum of the squares of any arbitrary junctions.

---

The invention herein described may be manufactured and used by or for the Government of the United States of America for governmental purposes without the payment of any royalties thereon or therefor.

The present invention relates to computers and more particularly to a simple and effective method for obtaining the square root of an arbitrary electrical input signal. A semiconductor Hall generator is used in conjunction with additional devices and circuitry to obtain an electrical output signal proportional to the square root of an applied input potential. The circuit is of importance for analog computers. This invention also relates to the use of Hall effect squaring devices and the present square root device for solving the problem of reducing detected three coordinate accelerations to distance and velocity data.

Previous methods in use for analog square root computers are described, for example, on page 154 of the book, "Electron Tube Circuits," by S. Seely, McGraw-Hill Book Co., Inc., New York, 1950. However, the previous methods require complex circuits, and for DC operation, are generally limited in range to the linear response region of the component DC amplifiers; also special provisions are required for circuit stabilization.

This invention is also related to U.S. patent application Ser. No. 305,015, filed Aug. 27, 1963 by Harry H. Wieder for Ballistic Speed and Distance Computer and now abandoned. Another invention by Harry H. Wieder, U.S. patent application Ser. No. 305,019 filed Aug. 27, 1963, for Analog Computer Device, relates to analog division using a Hall generator.

It is an object of the invention to provide a simple, stable and rugged squaring circuit for use in a square root analog computer;

Another object of the invention is to provide an analog square root computer which is more rugged and has better dynamic range than prior devices;

It is also an object of the invention to provide a computer for giving the absolute value of any three dimensional vector which may be converted into time varying currents.

Another object of the invention is to provide a ballistic speed and distance computer.

A further object of the invention is to provide a novel analog square root computer circuit using a Hall generator;

Other objects and many of the attendant advantages of the invention will become readily appreciated as the same becomes better understood by reference to the following detailed description when considered in connection with the accompanying drawings wherein.

Figure 1:
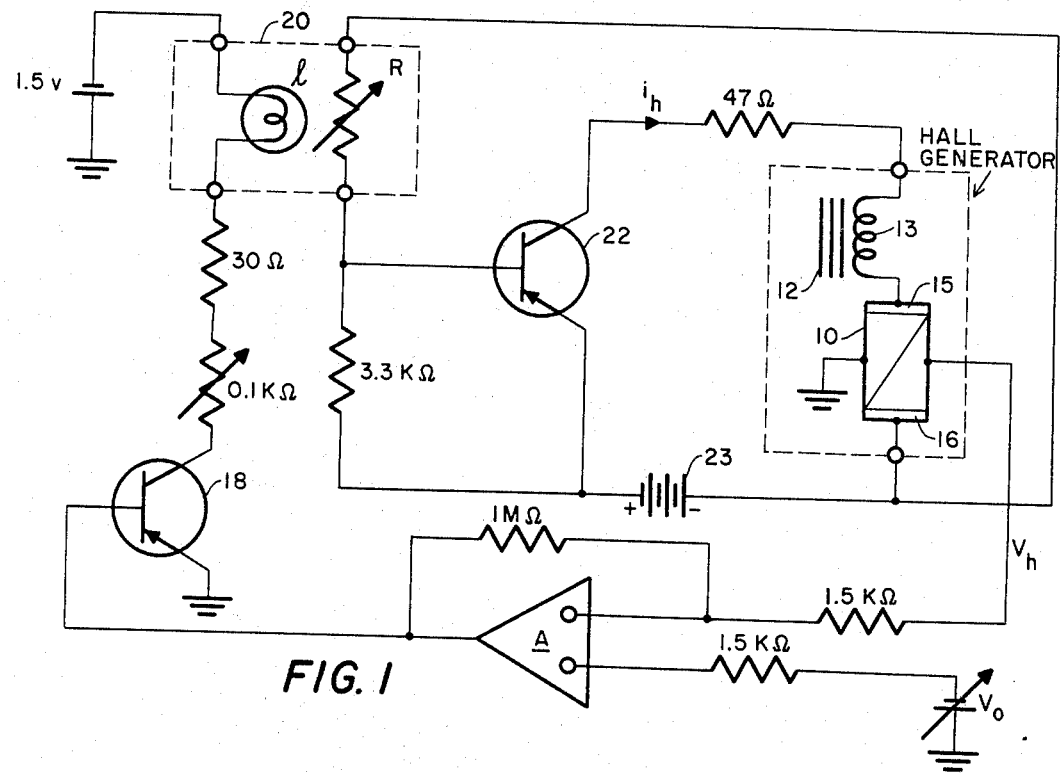
FIG. 1 is a schematic circuit diagram of a preferred embodiment of the invention.

The construction of the square root computer, of this invention, and its operation may be understood with reference to FIG. 1. The apparatus enclosed by the dashed square labeled Hall generator, comprises a commercially available Hall generator plate 10 mounted on the center post of a ferrite cup core 12. Within the cup core a magnetic field is generated perpendicular to the plane of the Hall plate by a solenoid 13 also shown in the enclosed rectangle to be in series with the drive-current electrodes 15 and 16 of Hall plate 10. The Hall voltage output $v_h$, of Hall plate 10 is proportional to the product of the magnetic induction B and the drive current $i_h$ or: $v_h = \alpha \beta i_h$ where $\alpha$ is a material parameter to be considered here as a constant. The magnetic induction is a function of a parameter $\beta$, which includes the permeability and geometry of the core and of the magnetizing current which in this case is also the Hall current i.e. $B = \beta i_h$ and therefore:

$$v_h = \alpha \beta i_h^2 \tag{1}$$

The Hall voltage $v_h$, proportional to the square of the drive current, is then applied to one of the input ports of the differential amplifier A. The other input port receives the input signal voltage $v_o$. The difference $(v_o - v_h)$ amplified by the gain of the differential amplifier, drives the grounded emitter power amplifier 18 (using a 2N652 transistor for example). The output current of the latter stage drives an incandescent lamp $l$ whose light intensity output determines the corresponding resistance of a photoresistor R. The lamp and photoresistor represent an electro-optical assembly (shown in FIG. 1 by the dashed rectangle 20) such as the "Raysistor" made by the Raytheon Manufacturing Co. The purpose of the Raysistor in this circuit is to isolate the Hall plate input from the output (relative impedances are $\sim$/ohm) and thus prevent severe loading of amplifier A. Resistance values shown are by way of example.

A 2N174 power transistor 22, for example, in a common emitter configuration controls the current $i_h$ obtained from voltage source 23 (e.g. 10 volt).

Let $v_o=0$, the Hall current is then $i_h \approx 1$ ma. and $v_h$ is substantially zero. Let a potential $v_o$ be applied to the input of amplifier A. The amplified output signal drives the base of transistor 18 causing a current to flow through lamp $l$ and sharply decreasing the resistance of photoresistor R. This causes a decrease in the bias applied to the base of power transistor 22 and consequently causes a current $i_h$ to flow through the solenoid winding 13 in series with Hall plate 10. Thus a Hall voltage $v_h$ is generated and appears at the other input terminal of amplifier A. The current $i_h$ and hence the Hall voltage $v_h$, increase up to the time when $v_h = v_o$ when they reach a steady state condition hence from (1):

$$v_o = \alpha \beta i_h^2 \tag{2}$$

Thus the drive current $i_h$ is proportional to the square root of the input potential $v_o$:

$$i_h = (v_o/\alpha\beta)^{1/2} \tag{3}$$

Figure 2:
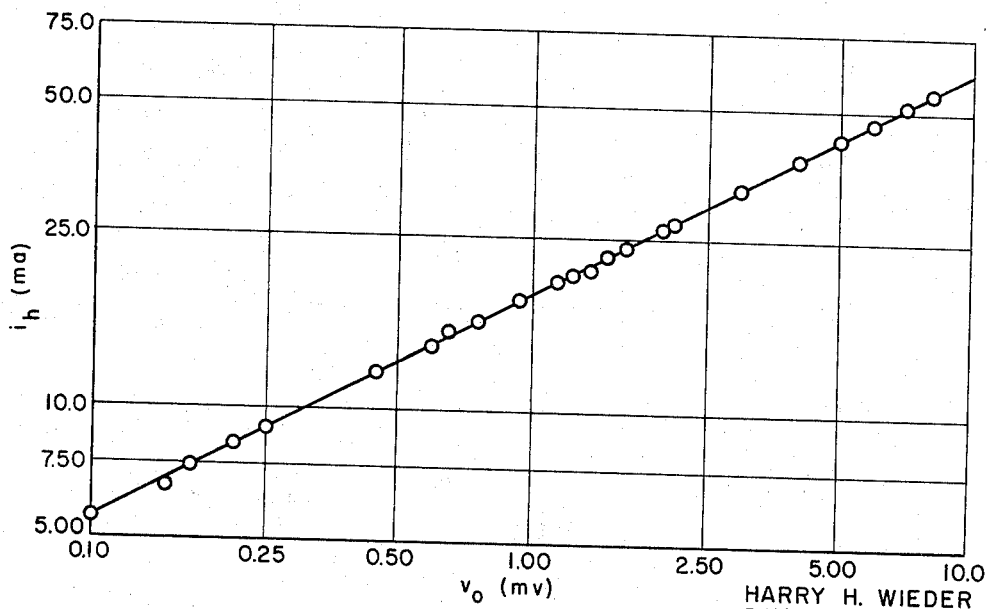
FIG. 2 shows a plot of drive current $i_h$ vs. input potential $v_o$ for the circuit of FIG. 1

FIGURE 2 shows the preliminary results obtained with the circuit of FIG. 1. A log-log plot of $i_h$ vs. $v_o$ is seen to have a slope of ($\frac{1}{2}$) in agreement with Equation 3 over two decades of the input potential with an accuracy better than 1.5%.

The advantage of this method for computing the square root of an electrical input signal rests to a large extent upon the squaring circuit, i.e. the use of the Hall effect in an intermetallic semiconductor such as indium antimonide for obtaining an output which is proportional to the input current squared. While this feature has been described in the literature quite often, for example in the article by W. J. Grubbs, Bell Syst. Tech. J., 38, 853 (1959), its use in a square root computer is quite new. The linearity of the Hall effect squaring circuit is particularly suited for obtaining a wide dynamic range and its ruggedness and simplicity and stability is particularly advantageous for portable use. The use of an electro-optic device such as, or similar to, the Raysistor for decoupling the input from the output circuit of the Hall plate, is new and of special importance in standard, bulk crystalline Hall plates, though of lesser importance in thin film Hall plates.

Supposing that the voltage source $V=10$ volts in FIG. 1 is a source of A.C. potential. The drive current $i_h$ will also be A.C. Let $v_o$ be an A.C. voltage of the same frequency and in phase with $i_h$, then amplifier A may be an A.C. differential amplifier and the electro-optical device 20 can be replaced by a transformer and still the essential input to output isolation may be achieved.

The Hall voltage frequency response depends upon the frequency response of the cup core 12 and solenoid 13. Hall plate 10 itself responds up to and beyond frequencies in the kmc. $\mu$-wave region, such a square root computer may be designed for wideband frequency response provided that due account is taken of synchronization between $v_h$ and $v_o$.

An ionized gas lamp may be used instead of the filamentary lamp $l$ shown in FIG. 1 for the electro-optical device 20. Experiments also show that the effectiveness of an electroluminescent panel, photoconductor type device is useful instead of the Raysistor type device although it is much less sensitive.

The differential amplifier A may be replaced by a single ended D.C. amplifier provided that the input signal $v_o$ is placed in series with the output signal $v_h$.

The construction and operation of an analog computer yielding an electrical output signal proportional to the speed and/or the distance covered by an object in a ballistic trajectory is discussed below. The theory of operation of such a computer is based on simple Newtonian mechanics. Consider a Cartesian coordinate system in which an object is moving with an acceleration continuously changing in time and dependent upon the position within a fixed trajectory. The absolute value of the vector velocity $v$, is:

$$v = \int_0^t \left[ \left(\frac{k^2 x}{dt^2}\right)^2 + \left(\frac{d^2 y}{dt^2}\right)^3 + \left(\frac{d^2 z}{dt^2}\right)^3 \right]^{1/2} \cdot dt \quad (4)$$

An integration of $v$ with respect to time yields then the distance $s$, covered in the interval $$s = \int_0^t v \cdot dt \quad (5)$$

The computer hereinafter described solves either or both of the above equations using a maximum number of passive components of simple construction based upon the large Hall effect present in intermetallic semiconductor plates of $n$-type indium antimonide and indium arsenide. The construction of such a computer for ballistics, for example, is shown in the block diagram of FIG. 3.

Obviously many modifications and variations of the present invention are possible in the light of the above teachings. It is therefore to be understood that within the scope of the appended claims the invention may be practiced otherwise than as specifically described.

Figure 4:
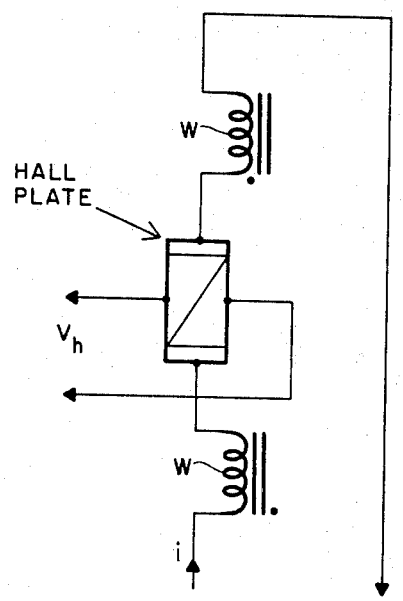
FIG. 4 is a schematic diagram of Hall squaring multiplier.

The current from each of the accelerometers X, Y, and Z is applied to squaring multipliers 31, 32, and 33 based upon the Hall effect. Variable reluctance or differential transformer type accelerometers which yield an output current proportional to the acceleration vector sensed respectively along the $x$, $y$, and $z$ coordinates are preferred. The use of Hall generators for the construction of square law multipliers is well known. The principle is shown in FIG. 4. A current $i$ passes through the solenoid winding W (which is split and connected in series with the Hall plate) of an electromagnet generating a magnetic induction B, at right angles to the direction of flow of the same current through the Hall semiconductor plate. The Hall voltage $v_h$ arises in consequence at right angles to both the magnetic field at the current vectors. Since the magnetic induction is $B = \alpha i$ with $\alpha$ a constant parameter which is a function of the effective permeability and the number of turns in the magnetic circuit:

$$v_h = (R_h/\delta)\alpha i^2 \times 10^{-8} \text{ volts} \quad (6)$$

where $R_h$ is the Hall coefficient and $\delta$ is the thickness of the semiconductor plate are constant parameters; therefore 6 may be written as:

$$v_h = \beta i^2 \quad (7)$$

The three Hall voltages $v_{hx}$, $v_{hy}$, and $v_{hz}$ obtained from the respective accelerometers $x$, $y$, and $z$ and their corresponding squaring multipliers 31, 32, and 33 are then applied to a simple Kirchoff linear adder 35 and thus the computation within the bracket of Equation 4 is completed.

The output of adder 35 is a potential $v_o$ such that:

$$v_o = \beta(i_x^2 + i_y^2 + i_z^2) \quad (8)$$

$v_o$ is applied to the input of a square root computer 36 as shown in FIG. 1. The Hall current $i_h$, of such a computer is given by:

$$i_h = \gamma v_o^{1/2} \quad (9)$$

where $\gamma$ is a constant parameter. The current or a signal proportional to the current is then integrated with respect to time in a conventional integrating amplifier 38. The output signal $v_r$ of the latter, is proportional to the absolute velocity in accordance with Equation 4, i.e.:

$$v = \eta v_r = (\xi \gamma) \int_0^t v_o^{1/2} \cdot dt \quad (10)$$

where $\xi$ is a constant parameter of the integrating amplifier. A second such integrator 39 in series will then yield the distance $s$ in accordance with Equation 5.

The advantage in using squaring multipliers and a square root computer based upon the Hall effect rests not only upon the simplicity of such devices, but also upon the inherent accuracy and wide dynamic range as well as frequency response limited primarily by the impedance of the magnetic circuit. Accelerometers X, Y, and Z can be of the type disclosed in Industrial Engineering, vol. 3, part 1 by Draper and McKay, page 645,, McGraw-Hill, 1955. Substantially identical squaring multipliers as in FIG. 4 built from a pot core and commercially available Hall generators can be used and adder 35 may consist of a feed back summing amplifier using a 6AC7 vacuum tube for example; also a suitable adder is shown on page 158 of Electronic Analog and Hybrid Computer Circuits by Korn and Korn, McGraw-Hill, 1952 where adders are fully discussed in Chapter 5, and suitable integrating amplifiers are shown on pages 129–146. A transistor summing amplifier can, of course, be used as adder 35. The output from the summing amplifier 35 is applied to the square root computer 36 whose operation and use are shown in FIG. 1 and described in detail above. Integrators 38 and 39 and their design is conventional as well as the region of their operation.

It was found experimentally that the square root of the sum of the squares of the input currents can be obtained to at least within 5% between $i=10$ $\mu a$ and $i=10$ ma.

Figure 3:
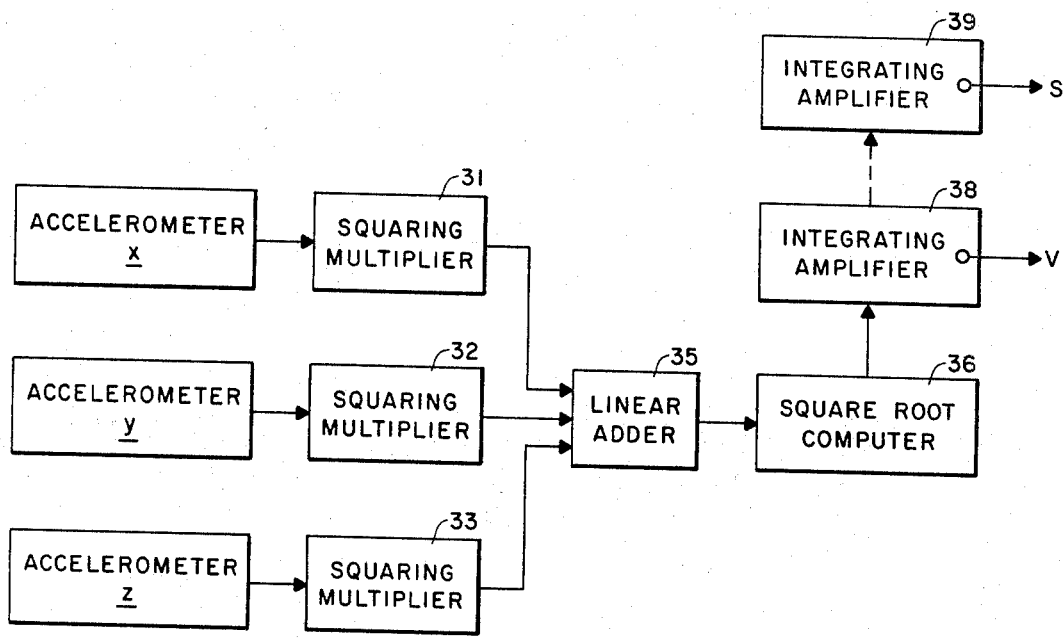
FIG. 3 is a block diagram of a computer of the present invention for giving the absolute value of any three dimensional vector converted to time varying currents.

The computer of FIG. 3 has many uses. For example, it may be used whenever the absolute value of any three dimensional vector or the square root of the sum of the squares of any arbitrary functions which, by means of transducers, may be converted into time varying currents is required.

What is claimed is:

1. An analog square root computer circuit comprising:
   (a) a Hall plate,
   (b) a first means connected in series with said Hall plate for both applying a Hall current to the Hall plate input and subjecting said Hall plate to a magnetic field for generating a Hall voltage across said Hall plate output, said Hall voltage being directly proportional to the product of the Hall current and the effective magnetic field,
   (c) a differential amplifier having an arbitrary input signal fed thereto,
   (d) said Hall voltage also being fed to said differential amplifiers which produces an output signal proportional to the difference between said Hall voltage and said arbitrary input signal,
   (e) an electro-optical device consisting of a lamp and photoresistor,
   (f) control means, to which the output of said differential amplifier is fed, connected in series with said lamp for controlling the light intensity emitted by said lamp,
   (g) the light intensity of said lamp controlling the resistance of said photoresistor,
   (h) said photoresistor being connected to said first means for controlling the Hall current,
   (i) said electro-optical device completing a feedback loop around said differential amplifier and also isolating the Hall current input from the output circuit of the Hall plate.

2. An analog square root computer circuit comprising:
   (a) a Hall plate,
   (b) a first means connected in series with said Hall plate for both applying a Hall current to the Hall plate input and subjecting said Hall plate to a magnetic field for generating a Hall voltage across said Hall plate output, said Hall voltage being directly proportional to the product of the Hall current and the effective magnetic field,
   (c) said first means consisting of a Hall current source and solenoid in series, said Hall current also being the magnetizing current through said solenoid for generating said magnetic field,
   (d) a differential amplifier having an arbitrary input signal fed thereto,
   (e) said Hall voltage also being fed to said differential amplifiers which produces an output signal proportional to the difference between said Hall voltage and said arbitrary input signal,
   (f) an electro-optical device consisting of a lamp and photoresistor,
   (g) control means, to which the output of said differential amplifier is fed, connected in series with said lamp for controlling the light intensity emitted by said lamp,
   (h) the light intensity of said lamp controlling the resistance of said photoresistor,
   (i) said photoresistor being connected to said first means for controlling the Hall current,
   (j) said electro-optical device completing a feedback loop around said differential amplifier and also isolating the Hall current input from the output circuit of the Hall plate.

3. An analog square root computer circuit comprising:
   (a) a Hall plate,
   (b) first means for both applying a Hall current to said Hall plate input and subjecting the Hall plate to a magnetic field for generating a Hall voltage across said Hall plate output,
   (c) a differential amplifier having an arbitrary input signal fed thereto,
   (d) said Hall voltage also being fed to said differential amplifiers which produces an output signal proportional to the difference between said Hall voltages and said arbitrary input signal,
   (e) an electro-optical device consisting of a lamp and photoresistor,
   (f) control means, to which the output of said differential amplifier is fed, connected in series with said lamp for controlling the light intensity emitted by said lamp,
   (g) the light intensity of said lamp controlling the resistance of said photoresistor,
   (h) said photoresistor being connected to said first means for controlling the Hall current,
   (i) said electro-optical device completing a feedback loop around said differential amplifier and also isolating the Hall current input from the output circuit of the Hall plate wherein when an arbitrary input signal is applied to said differential amplifier the output thereof which is fed to said means for controlling the intensity of said lamp will cause a current to flow through the lamp in turn causing the resistance of said photoresistor to decrease and consequently cause a Hall current from said first means to flow through said solenoid and Hall plate thereby generating a Hall voltage across the Hall plate, the Hall current and hence the Hall voltage increasing until a steady state condition is reached when said arbitrary input signal equals said Hall voltage, the Hall current thus being proportional to the square root of said input signal.

4. An analog square root computer circuit comprising:
   (a) a Hall plate,
   (b) a first means connected in series with said Hall plate for both applying a Hall current to the Hall plate input and subjecting said Hall plate to a magnetic field for generating a Hall voltage across said Hall plate output, said Hall voltage being directly proportional to the product of the Hall current and the effective magnetic field,
   (c) a differential amplifier having an arbitrary input signal fed thereto,
   (d) a second means which is controlled by the output of said differential amplifier and has the output of said differential amplifier fed to one portion thereof having the other portion thereof connected to said first means for controlling the Hall current applied to the Hall plate input, said one portion of said second means completing the feedback loop around the Hall plate output circuit and the two portions of said second means providing isolation between the Hall current input and the Hall plate output circuit.

5. An analog square root computer circuit comprising:
   (a) a Hall plate,
   (b) a first means connected in series with said Hall plate for both applying a Hall current to the Hall plate input and subjecting said Hall plate to a magnetic field for generating a Hall voltage across said Hall plate output, said Hall voltage being directly proportional to the product of the Hall current and the effective magnetic field,
   (c) said first means consisting of a Hall current source and solenoid in series, said Hall current also being the magnetizing current through said solenoid for generating said magnetic field,
   (d) a differential amplifier having an arbitrary input signal fed thereto,
   (e) a second means which is controlled by the output of said differential amplifier and has the output of said differential amplifier fed to one portion thereof having the other portion thereof connected to said first means for controlling the Hall current applied to the Hall plate input, said one portion of said second means completing the feedback loop around the Hall plate output circuit and the two portions of said second means providing isolation between the Hall current input and the Hall plate output circuit.

6. An analog computer circuit for yielding an electrical output signal proportional to the value of any three dimensional vector, such as involving speed and distance covered by an object in a ballistic trajectory, comprising:
  (a) three acceleration sensing means which yield an output current proportional to the acceleration vector sensed respectively along $x$, $y$, and $z$ coordinates,
  (b) three Hall effect squaring multipliers, each one connected to a respective one of said acceleration sensing means and being fed the output current therefrom,
  (c) a linear summing means to which the voltage outputs of said squaring multipliers are fed,
  (d) a Hall effect square root computer, to which the output of said summing means is fed said square root computer comprising:
    (1) a Hall plate,
    (2) a first means connected in series with said Hall plate for both applying a Hall current to the Hall plate input and subjecting said Hall plate to a magnetic field for generating a Hall voltage across said Hall plate output, said Hall voltage being directly proportional to the product of the Hall current and the effective magnetic field,
    (3) a differential amplifier having an arbitrary input signal fed thereto,
    (4) a second means which is controlled by the output of said differential amplifier and has the output of said differential amplifier fed to one portion thereof having the other portion thereof connected to said first means for controlling the Hall current applied to the Hall plate input, said one portion of said second means completing the feedback loop around the Hall plate output circuit and the two portions of said second means providing isolation between the Hall current input and the Hall plate output circuit,
  (e) a first integrating means, to which the output of said square root computer is fed and integrated with respect to time, whose output signal of which is proportional to absolute velocity,
  (f) a second integrating means, to which the output of said first integrating means is fed, whose output is proportional to distance.

References Cited

UNITED STATES PATENTS 3,121,788  2/1964  Hilbinger _____ 235—194
3,215,824  11/1965 Alexander et al. ___ 235—194 X MALCOLM A. MORRISON, *Primary Examiner.*

J. F. RUGGIERO, *Assistant Examiner.*